(12) United States Patent
Lee et al.

(10) Patent No.: US 9,953,322 B2
(45) Date of Patent: Apr. 24, 2018

(54) MOBILE PAYMENT METHOD, SYSTEM AND DEVICE USING HOME SHOPPING

(71) Applicant: SK PLANET CO., LTD., Seoul (KR)

(72) Inventors: Won Jun Lee, Seoul (KR); Dong Phil Lim, Seoul (KR); Hye Youn Chung, Seoul (KR); Se Hyun Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 268 days.

(21) Appl. No.: 14/007,540

(22) PCT Filed: Oct. 11, 2012

(86) PCT No.: PCT/KR2012/008235
§ 371 (c)(1),
(2) Date: Sep. 25, 2013

(87) PCT Pub. No.: WO2013/055113
PCT Pub. Date: Apr. 18, 2013

(65) Prior Publication Data
US 2014/0222676 A1    Aug. 7, 2014

(30) Foreign Application Priority Data

Oct. 13, 2011  (KR) .................. 10-2011-0104770
Oct. 14, 2011  (KR) .................. 10-2011-0105248

(51) Int. Cl.
*G06Q 20/32*      (2012.01)
*G06Q 20/38*      (2012.01)
(Continued)

(52) U.S. Cl.
CPC ......... *G06Q 20/405* (2013.01); *G06Q 20/102* (2013.01); *G06Q 20/12* (2013.01);
(Continued)

(58) Field of Classification Search
CPC .. G06Q 20/367; G06Q 20/20; G06Q 20/3674; G06Q 20/16
See application file for complete search history.

(56) References Cited

U.S. PATENT DOCUMENTS

| 8,467,766 | B2 * | 6/2013 | Rackley, III ......... G06Q 20/042 455/406 |
| 2002/0147658 | A1 * | 10/2002 | Kwan .................... G06Q 20/04 705/16 |

(Continued)

FOREIGN PATENT DOCUMENTS

| KR | 1020020025933 A | 4/2002 |
| KR | 1020070105072 A | 10/2007 |

(Continued)

OTHER PUBLICATIONS

International Search Report dated Jan. 28, 2013 for PCT/KR2012/008235.

(Continued)

*Primary Examiner* — Narayanswamy Subramanian
*Assistant Examiner* — Christopher Bridges
(74) *Attorney, Agent, or Firm* — Hauptman Ham, LLP

(57) ABSTRACT

The present embodiment relates to a mobile payment method, system and device using home shopping, wherein OTP (One Time Password) information is verified through a telephone conversation with an agent, ARS or a webpage, depending on the method for purchasing the specific merchandise chosen by the user in the process of executing a mobile payment using home shopping, and electronic payment is executed more rapidly and securely thereby. The present embodiment also relates to a mobile payment method, system and device adapted for transmission using an applicable payment device, without need for direct user input of OTP (One Time Password) information based on payment-means information chosen by the user in the pro- (Continued)

cess of executing a mobile payment using a terminal, and adapted to allow the execution of more secure payments through verification in accordance with the selected payment means.

19 Claims, 7 Drawing Sheets

(51) Int. Cl.
    *G06Q 20/40*     (2012.01)
    *G06Q 20/12*     (2012.01)
    *G06Q 20/16*     (2012.01)
    *G06Q 20/10*     (2012.01)
    *G06Q 20/14*     (2012.01)

(52) U.S. Cl.
    CPC ............ *G06Q 20/14* (2013.01); *G06Q 20/16* (2013.01); *G06Q 20/322* (2013.01); *G06Q 20/3223* (2013.01); *G06Q 20/382* (2013.01); *G06Q 20/385* (2013.01)

(56) References Cited

U.S. PATENT DOCUMENTS

| | | | | |
|---|---|---|---|---|
| 2004/0064406 | A1* | 4/2004 | Yates | ...................... G06F 21/42 705/40 |
| 2006/0271496 | A1* | 11/2006 | Balasubramanian | .. G06Q 20/04 705/64 |
| 2008/0249947 | A1* | 10/2008 | Potter | ...................... G06F 21/31 705/67 |
| 2010/0051686 | A1* | 3/2010 | Obi | ......................... G06Q 20/12 235/379 |
| 2011/0022483 | A1* | 1/2011 | Hammad | ................ G06Q 20/12 705/17 |
| 2011/0143711 | A1* | 6/2011 | Hirson | ................... G06Q 20/32 455/410 |

FOREIGN PATENT DOCUMENTS

| | | |
|---|---|---|
| KR | 1020080044029 A | 5/2008 |
| KR | 1020090019278 A | 2/2009 |
| KR | 1020100009150 A | 1/2010 |
| KR | 1020100012264 A | 2/2010 |
| KR | 1020100048401 A | 5/2010 |
| KR | 1020100135617 A | 12/2010 |

OTHER PUBLICATIONS

Korean Notice of Allowance for application No. 10-2011-0104770 dated Jul. 10, 2014.
Korean Office Action for application No. 10-2011-0104770 dated Nov. 30, 2013.

\* cited by examiner

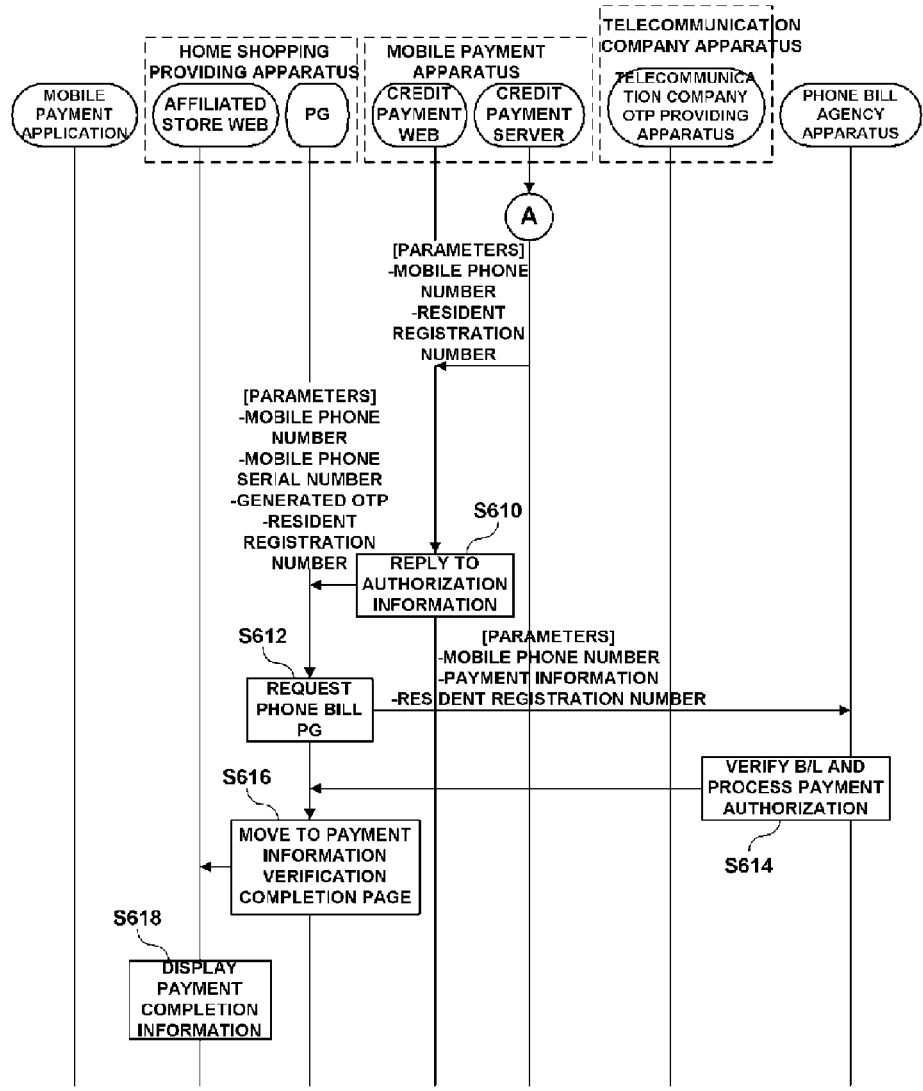

MOBILE PAYMENT METHOD, SYSTEM AND DEVICE USING HOME SHOPPING

CROSS REFERENCE TO RELATED APPLICATION

This application claims the priority of Korean Patent Application No. 10-2011-0104770, filed on Oct. 13, 2011 and No. 10-2011-0105248, filed on Oct. 14, 2011 in the KIPO (Korean Intellectual Property Office). Further, this application is the National Phase application of International Application No. PCT/KR2012/008235 filed on Oct. 11, 2012, which designates the United States and was published in Korean.

TECHNICAL FIELD

The present invention relates to a mobile payment method, system, and apparatus using home shopping, which authenticates one-time password (OTP) information through a phone call to a counselor, an ARS, or a web page depending on a purchase method of a specific commodity selected by a user in a process of performing a mobile payment using home shopping, thus allowing the user to rapidly and safely perform the mobile payment.

Moreover, the present invention relates to a mobile payment method, system, and apparatus using home shopping, which transmits OTP information depending on payment method information selected by a user to a corresponding payment apparatus without the need for the user to directly input the OTP information in a process of performing a mobile payment using a terminal, thus allowing the user to more safely perform the payment through authentication of the selected payment method.

BACKGROUND ART

The information disclosed in this section is only to provide background information about the embodiments and does not form the prior art.

A credit card, debit card, or payment through a bank account is generally used to make a payment for home shopping or electronic commerce. However, conventional payment methods have the inconvenience to have cash for cash payment, the risk of loss of cash, the inconvenience to return changes, etc. Meanwhile, in addition to these problems, the use of credit cards has been recommended as a way to increase transparency in taxation of business transactions, and many other payment methods have been developed. In particular, with the steady growth of the electronic commerce on the Internet, the payment market is expanding rapidly. Moreover, while most payment methods on the Internet are credit cards and online payments, new payment methods using mobile phones or wired and wireless automatic response services (ARSs) have recently emerged and their frequency of use is increasing rapidly.

However, in the case of these payment methods, it is inconvenient to get a separate module or card, and damage is caused due to leakage of personal information, which is problematic.

DISCLOSURE

Technical Problem

An object of the present invention to solve the above problems is to provide a mobile payment method, system, and apparatus using home shopping, which authenticates one-time password (OTP) information through a phone call to a counselor, an ARS, or a web page depending on a purchase method of a specific commodity selected by a user in a process of performing a mobile payment using home shopping, thus allowing the user to rapidly and safely perform the mobile payment.

Moreover, another object of the present invention to solve the above problems is to provide a mobile payment method, system, and apparatus using home shopping, which transmits OTP information depending on payment method information selected by a user to a corresponding payment apparatus without the need for the user to directly input the OTP information in a process of performing a mobile payment using a terminal, thus allowing the user to more safely perform the payment through authentication of the selected payment method.

Technical Solution

According to an aspect of the present invention to achieve the above objects, there is provided a mobile payment system comprising: a mobile payment apparatus which, when payment request information is received, receives payment method information and one-time password (OTP) information corresponding to the payment method information from at least one of a terminal, a user terminal, and a home shopping providing apparatus depending on purchase method selection information and, when the OTP information is authenticated using at least one of a telecommunication company apparatus and a card company apparatus, performs payment processing for the payment request information; and the home shopping providing apparatus which transmits the OTP information, generated through a voice call between the terminal and a counselor terminal, and the OTP information, generated using a dual tone multi frequency (DTMF) input from the terminal, to the mobile payment apparatus.

The home shopping providing apparatus may comprise: a voice call providing unit which transmits the OTP information generated through the voice call between the terminal and the counselor terminal to the mobile payment apparatus; an automatic response providing unit which transmits the OTP information, generated using the DTMF input from the terminal, to the mobile payment apparatus; a web providing unit which transmits the OTP information received from the user terminal to the mobile payment apparatus; and a payment gateway (PG) which links to the mobile payment apparatus based on the payment request information.

The mobile payment system may further comprise the terminal which transmits at least one of the payment request information, the payment method information including credit card information or phone bill information, the OTP information corresponding to the credit card information, and the OTP information corresponding to the phone bill information to the mobile payment apparatus, receives payment completion information from the mobile payment apparatus, and displays the received information.

According to another aspect of the present invention to achieve the above objects, there is provided a mobile payment apparatus comprising: a payment information reception unit which receives payment request information depending on purchase method selection information for a specific commodity or payment request information for an accessed terminal from a home shopping providing apparatus; an OTP information reception unit which receives one-time password (OTP) information from at least one of the home shopping providing apparatus, a terminal, and a user terminal; a payment method synchronization unit which receives payment method information from the terminal and synchronizes the received information depending on the purchase method selection information; an OTP information authentication unit which receives OTP information corresponding to the payment method information from the OTP information reception unit and authenticates the OTP information using at least one of a telecommunication company apparatus and a card company apparatus; and a payment authorization unit which, when the OTP information is authenticated, transmits a transaction authorization request signal for the synchronized payment method information to the telecommunication company apparatus or the card company apparatus, receives a transaction authorization response signal corresponding to the transaction authorization request signal, and transmits a payment information verification completion signal to the home shopping providing apparatus.

The OTP information reception unit may comprise: a voice reception unit which is connected to a voice call providing unit of the home shopping providing apparatus; an automatic response reception unit which is connected to an automatic response providing unit of the home shopping providing apparatus; and a web reception unit which is connected to a web providing unit of the home shopping providing apparatus.

The voice reception unit may receive the OTP information, generated based on information on a voice call between the terminal and a counselor terminal, from the voice call providing unit.

The automatic response reception unit may receive the OTP information, generated using a dual tone multi frequency (DTMF) input from the terminal, from the automatic response providing unit.

The web reception unit may receive the OTP information from the user terminal connected to the web providing unit.

The OTP information reception unit may receive identification information on the terminal depending on the purchase method selection information from at least one of the voice call providing unit, the automatic response providing unit, and the web providing unit.

The identification information may comprise at least one of phone number information, mobile directory number (MDN), and electronic serial number (ESN).

The OTP information authentication unit may identify the synchronized payment method information, and when the payment method information is credit card information, authenticate the OTP information using a card company OTP providing unit connected to the card company apparatus by transmitting an OTP authentication request signal to the card company OTP providing apparatus and receiving an OTP authentication response signal corresponding to the OTP authentication request signal.

When the OTP information corresponding to the credit card information is generated, the OTP information authentication unit may identify telecommunication company member information on the terminal using the telecommunication company apparatus.

When the telecommunication company member information is identified as an authorized member, the payment authorization unit may transmit an authorization request signal for a mobile payment to a value-added communication network (VAN) and receive an authorization response signal corresponding to the authorization request signal from the value-added communication network.

The OTP information authentication unit may identify at least one of phone number information, mobile payment application ID information, name information, and service subscription information to identify the telecommunication company member state.

The OTP information authentication unit may identify the synchronized payment method information, and when the payment method information is phone bill information, authenticate the OTP information using a telecommunication company OTP providing apparatus connected to the telecommunication company apparatus by transmitting an OTP authentication request signal to the telecommunication company OTP providing apparatus and receiving an OTP authentication response signal corresponding to the OTP authentication request signal.

When the OTP information for the phone bill information is authenticated, the payment authorization unit may transmit the transaction authorization request signal for the phone bill information to the home shopping providing apparatus.

The payment authorization unit may receive the transaction authorization response signal corresponding to the transaction authorization request signal from a phone bill agency apparatus connected to the home shopping providing apparatus.

The payment authorization unit may perform black list (B/L) verification for the transaction authorization request signal through the phone bill agency apparatus, and when the B/L verification is completed, receive the transaction authorization response signal corresponding to the transaction authorization request signal from the phone bill agency apparatus.

When the synchronized payment method information is credit card information, the payment authorization unit may transmit the transaction authorization request signal including at least one of card nickname information, virtual card number information, and the OTP information to the card company apparatus and receive the transaction authorization response signal corresponding to the transaction authorization request signal from the card company apparatus.

The mobile payment apparatus may further comprise a message transmission unit which transmits a push message for executing a mobile payment application to a terminal having identification information, the push message including at least one message based on short message service (SMS), multimedia message service (MMS), and Internet protocol (IP).

According to still another aspect of the present invention to achieve the above objects, there is provided a terminal comprising: a browser unit which accesses a home shopping providing apparatus, displays commodity information received from the home shopping providing apparatus, and transmits payment request information for specific commodity information among the commodity information, received from the home shopping providing apparatus, to a mobile payment apparatus; an application execution unit which executes a mobile payment application in response to a call request signal received from the home shopping providing apparatus; a major payment method synchronization unit which, when personal identification number (PIN) information input to authenticate payment request information by a user's manipulation or command is authenticated, transmits selected payment method information to the mobile payment apparatus; an OTP information transmission unit which, when the payment method information is synchronized with the mobile payment apparatus, generates OTP information based on the payment method information and transmits the generated OTP information to the mobile payment apparatus; and a payment completion process unit which receives payment completion information from the mobile payment apparatus and displays the received information.

According to yet another aspect of the present invention to achieve the above objects, there is provided a mobile payment method, which performs a mobile payment using home shopping in a mobile payment apparatus, the mobile payment method comprising the steps of: receiving payment request information depending on purchase method selection information for a specific commodity or payment request information for an accessed terminal from a home shopping providing apparatus; receiving one-time password (OTP) information from at least one of the home shopping providing apparatus, a terminal, and a user terminal; receiving payment method information from the terminal and synchronizing the received information depending on the purchase method selection information; receiving OTP information corresponding to the payment method information and authenticating the OTP information using at least one of a telecommunication company apparatus and a card company apparatus; and when the OTP information is authenticated, transmitting a transaction authorization request signal for the synchronized payment method information to the telecommunication company apparatus or the card company apparatus, receiving a transaction authorization response signal corresponding to the transaction authorization request signal, and transmitting a payment information verification completion signal to the home shopping providing apparatus.

According to still yet another aspect of the present invention to achieve the above objects, there is provided a mobile payment method, which performs a mobile payment using home shopping in a terminal, the mobile payment method comprising the steps of: accessing a home shopping providing apparatus, displaying commodity information received from the home shopping providing apparatus, and transmitting payment request information for specific commodity information among the commodity information, received from the home shopping providing apparatus, to a mobile payment apparatus; executing a mobile payment application in response to a call request signal received from the home shopping providing apparatus; receiving one-time password (OTP) personal identification number (PIN) information for the mobile payment application by a user's manipulation or command, selecting payment method information, and transmitting selected payment method information to the mobile payment apparatus; when the payment method information is synchronized with the mobile payment apparatus, generating OTP information based on the payment method information through a voice call to a counselor terminal or using a dual tone multi frequency (DTMF) input from the user, and transmitting the generated OTP information to the mobile payment apparatus; and receiving payment completion information from the mobile payment apparatus and displaying the received information.

Advantageous Effects

According to the present invention, it is possible to authenticate OTP information through a phone call to a counselor, an ARS, or a web page depending on a purchase method of a specific commodity selected by a user in a process of performing a mobile payment using home shopping, thus allowing the user to rapidly and safely perform the mobile payment.

Moreover, according to the present invention, the user does not have to directly input OTP information during payment, the payment can be easily performed, and the OTP information can be further authenticated through a card company or a telecommunication company depending on a payment method, thus increasing the security for the payment method.

DESCRIPTION OF DRAWINGS

FIG. 6 is a flowchart showing a payment method in which a payment method is phone bill information in accordance with a preferred embodiment of the present invention.

MODE FOR INVENTION

Hereinafter, preferred embodiments of the present invention will be described in detail with reference to the accompanying drawings.

As used herein, the term "electronic payment" refers to a payment used for home shopping, but not limited thereto, and many alterations and modifications may be made by those having ordinary skill in the art without departing from the spirit of the present invention.

Figure 1:
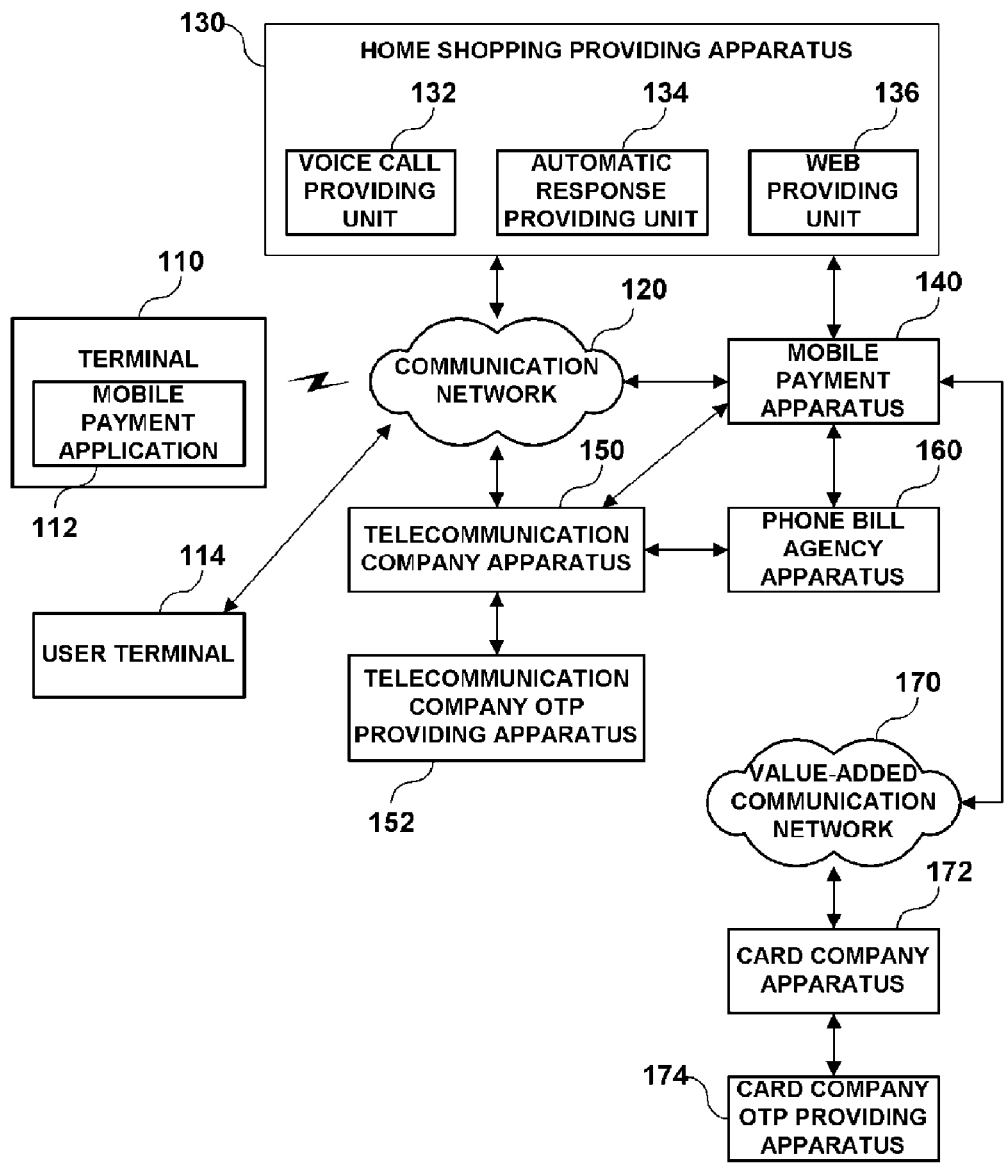
FIG. 1 is a block diagram schematically showing a mobile payment system in accordance with a preferred embodiment of the present invention.

FIG. 1 is a block diagram schematically showing a mobile payment system in accordance with a preferred embodiment of the present invention.

The mobile payment system according to this embodiment comprises a terminal 110, a mobile payment application 112, a user terminal 114, a communication network 120, a home shopping providing apparatus 130, a voice call providing unit 132, an automatic response providing unit 134, a web providing unit 136, a mobile payment apparatus 140, a telecommunication company apparatus 150, a telecommunication company OTP providing apparatus 152, a phone bill agency apparatus 160, a value-added communication network 170, a card company apparatus 172, and a card company OTP providing apparatus 174. While it is described in this present embodiment that the mobile payment system comprises only the terminal 110, the mobile payment application 112, the user terminal 114, the communication network 120, the home shopping providing apparatus 130, the voice call providing unit 132, the automatic response providing unit 134, the web providing unit 136, the mobile payment apparatus 140, the telecommunication company apparatus 150, the telecommunication company OTP providing apparatus 152, the phone bill agency apparatus 160, the value-added communication network 170, the card company apparatus 172, and the card company OTP providing apparatus 174, this is merely illustrative of the spirit of this embodiment of the present invention, and many alterations and modifications may be made to the components included in the mobile payment system by those having ordinary skill in the art without departing from the spirit of the present invention.

The terminal 110 refers to a terminal that can transmit and receive various data via the communication network 120 depending on a user's key manipulation and may be any one of a tablet PC, a laptop, a personal computer (PC), a smart phone, a personal digital assistant (PDA), and a mobile communication terminal. Moreover, the terminal 110 may be a cloud computing terminal supporting cloud computing which provides services such as reading, writing, and storing of data, networking, use of content, etc. through the communication network 120.

That is, the terminal 110 performs a voice or data communication using the communication network 120 and refers to a terminal equipped with a browser for communication with the mobile payment apparatus 140 via the communication network 120, a memory for storing programs and protocols, a microprocessor for calculation and control by executing various programs, etc. That is, any terminal is available as long as it provides server-client communication with the mobile payment apparatus 140 and is a broad concept that encompasses all communication computing devices such as a notebook computer, a mobile communication terminal, a PDA, etc. Meanwhile, the terminal 110 may preferably be provided with a touch screen, but not necessarily limited thereto. While the terminal 110 is implemented separately from the mobile payment apparatus 140 in this embodiment, the terminal 110 may be implemented as a standalone device that encompasses the mobile payment apparatus 140 in an actual implementation of the invention.

The terminal 110 executes the mobile payment application 112 in response to the user's manipulation or command and performs member registration through the mobile payment application 112. More specifically, when the terminal 110 is a smart phone, the mobile payment application 112 may be an application downloaded and installed from an application store, whereas when the terminal 110 is a feature phone, it may be an application executed by a virtual machine (VM) downloaded through the telecommunication company apparatus 150.

The terminal 110 should perform the member registration for an electronic payment, and this process will now be described. The terminal 110 performs the member registration through the mobile payment application 112 installed therein. Then, when at least one of message authentication information, user identification information authentication information, and terminal personal identification number (PIN) authentication information, which are input by the user for the member registration, is authenticated, the terminal 110 receives an application ID for performing the mobile payment and registers payment method information, thus completing the member registration. Meanwhile, the terminal 110 should download the mobile payment application 112, and this process will now be described. When the user's selection information through an application providing apparatus or the user's selection information through a payment gateway (PG) is input, the terminal 110 downloads the mobile payment application 112 from the application providing apparatus and installs the downloaded mobile payment application 112.

Moreover, in the member registration process, the terminal 110 determines whether the user identification information authentication information input by the user is authenticated. When it is determined that the user identification information authentication information is authenticated, the terminal 110 transmits a user identification information authentication procedure completion signal to the mobile payment apparatus 140 and receives an application ID from the mobile payment apparatus 140. Moreover, when the terminal PIN information input by the user is authenticated, the terminal 110 transmits a terminal PIN procedure completion signal to the mobile payment apparatus 140, registers payment method information input by the user, and receives a registration completion signal from the mobile payment apparatus 140, thus completing the member registration.

Furthermore, when the member registration process is completed, a major payment method is registered, which will now be described. The terminal 110 transmits payment method information selected by the user's manipulation or command to the mobile payment apparatus 140, and when the payment method information is authenticated, stores an OTP authentication key received from the mobile payment apparatus 140 in response to the payment method information, thus completing the registration of the payment method information. At this time, the terminal 110 receives an encrypted OTP authentication key from the mobile payment apparatus 140, decrypts the encrypted OTP authentication key, re-encrypts the decrypt OTP authentication key together with information (e.g., PIN information) required for the authentication, and stores the resulting OTP authentication key. Here, the payment method information includes at least one of credit card information, check card information, phone bill information, and financial account information. For the operation of the terminal 110, the terminal 110 uses the mobile payment application 112 installed therein.

That is, for the registration of the credit card information, the terminal 110 transmits payment method information including the credit card information as the major payment method to the mobile payment apparatus 140, selects any one of information from company information received from the mobile payment apparatus 140 and transmits payment method authentication information including at least one of phone number information for the selected company information, card company identification information, card nickname information, card number information, card expiration date information, virtual card number information, and CVC information to the mobile payment apparatus 140. Then, the terminal 110 stores an OTP authentication key received from the mobile payment apparatus 140 in response to the payment method information as the payment method information, thus completing the registration of the payment method information.

Moreover, for the registration of the phone bill information, the terminal 110 transmits payment method information including the phone bill information as the payment method to the mobile payment apparatus 140 and transmits phone bill registration information including at least one of phone number information and mobile payment application ID information depending on phone bill registration request information received from the mobile payment apparatus 140 to a payment method registration apparatus. Then, the terminal 110 stores an OTP authentication key received in response to the phone bill information as the payment method information from the mobile payment apparatus 140, thus completing the registration of the payment method information.

Meanwhile, the terminal 110 may inquire or change the payment method, and this process will be described in more detail below. When inquiry request information for the payment method information is input by the user's manipulation or command, the terminal 110 transmits the inquiry request information to the mobile payment apparatus 140 and receives corresponding transaction history identification information from the mobile payment apparatus 140. Moreover, when change request information for the payment method information is input by the user's manipulation or command, the terminal 110 transmits the change request information to the mobile payment apparatus 140 and receives corresponding change completion information from the mobile payment apparatus 140.

The purchase method selection information described in the present invention includes three cases such as "counselor connection", "ARS", and "website".

Among these purchase methods, the "counselor connection" is performed in a manner that the terminal 110 makes a voice call to a counselor terminal (not shown) to orally transmit OTP information to a counselor. That is, when selecting the call connection to the counselor from the purchase methods for a specific commodity, the user makes a call to the counselor terminal to orally transmit the OTP information to the counselor, and the counselor inputs the received OTP information to the mobile payment apparatus 140. In the purchase method selection information, the purchase method through the "ARS" is performed in a manner that the user transmits the OTP information by inputting a dual tone multi frequency (DTMF) according to automatic response. That is, when selecting the purchase method through the "ARS" for a specific commodity, the user transmits the OTP information generated by the mobile payment application 112 of the terminal 110 to the home shopping providing apparatus 130, and the home shopping providing apparatus 130 transmits the OTP information received from the user to the mobile payment apparatus 140.

In the present embodiment, the terminal 110 executes the mobile payment application 112 in response to a push message received from the mobile payment apparatus 140. Moreover, when authentication information input to authenticate payment request information by the user's manipulation or command is authenticated, the terminal 110 transmits selected payment method information to the mobile payment apparatus 140, generates OTP information based on the payment method information when the payment method information is synchronized with the mobile payment apparatus 140, transmits the generated information to the mobile payment apparatus 140, receives payment completion information from the mobile payment apparatus 140, and displays the received information.

The mobile payment application 112 refers to software that transmits payment method information selected by the user's manipulation or command, and when the payment method information is authenticated, stores an OTP authentication key received in response to the payment method information, thus completing the registration of the payment method information. The mobile payment application 112 may be implemented or designed to meet various operating system (OS) environments such as iOS, Android, Window Phone 7, etc.

Meanwhile, it is described in this embodiment that the terminal 110 is provided with the mobile payment application 112 to perform the member registration, but this operation process can be achieved only by the mobile payment application 112. That is, the mobile payment application 112 may be installed in the terminal 110 and executed in response to a push message received from the mobile payment apparatus 140. The functions of the mobile payment application 112 such as, when authentication information input to authenticate payment request information by the user's manipulation or command is authenticated, transmitting selected payment method information to the mobile payment apparatus 140, generating OTP information based on the payment method information when the payment method information is synchronized with the mobile payment apparatus 140, transmitting the generated OTP information to the mobile payment apparatus 140, receiving payment completion information from the mobile payment apparatus 140, and displaying the received information can be independently implemented.

The user terminal 114 is a device separate from the terminal 110 and refers to a terminal that can transmit and receive various data via the communication network 120 depending on the user's key manipulation and may be any one of a tablet PC, a laptop, a personal computer, a smart phone, a personal digital assistant, and a mobile communication terminal. Moreover, the user terminal 114 refers to a terminal equipped with a web browser for communication with the home shopping providing apparatus 130 in conjunction with the communication network 120, a memory for storing programs, a microprocessor for calculation and control by executing the programs, etc. That is, while the user terminal 114 is generally a personal computer, any terminal is available as long as it is connected to the communication network 120 and provides server-client communication with the home shopping providing apparatus 130, and the user terminal 114 is a broad concept that encompasses all communication computing devices such as a notebook computer, a mobile communication terminal, a PDA, etc.

Meanwhile, the purchase method through the "website" among the purchase method selection information described in the present invention is performed in the following manner. The user terminal 114 accesses a website provided by the home shopping providing apparatus 130 and inputs the OTP information based on the purchase method information for a specific commodity. That is, when selecting a website, which is displayed on a home shopping broadcast while watching the home shopping broadcast through a TV, IPTV, Internet sites, etc., as a purchase method for a home shopping commodity, the user inputs the OTP information generated by the terminal 110 and the purchase method information to the website through the user terminal 114, and the user terminal 114 transmits the input OTP information and purchase method information to the home shopping providing apparatus 130.

The communication network 120 refers to a network that can transmit and receive data via the Internet protocol using various wired and wireless communication technologies such as the Internet network, Intranet network, mobile communication network, satellite communication network, etc. Moreover, the communication network 120 may comprise a cloud computing network which is connected to the mobile payment apparatus 140 to store computing resources such as hardware, software, etc. and provide the computing resources required by a client to the corresponding terminal 110. Here, the cloud computing refers to a computing environment where information is permanently stored in a server on the Internet and temporarily stored in a client terminal such as a desktop, tablet, notebook, netbook, smart phone, etc., and the cloud computing network refers to a computer environment access network where all users' information is stored in a server on the Internet such that the information can be used anywhere and anytime through various IT devices. Here, the communication network 120 may preferably be configured to transmit image data, but not limited thereto.

The communication network 120 is a concept that generally refers to closed networks such as a local area network, wide area network (WAN), etc., open networks such as the Internet, etc., wireless communication networks such as code division multiple access (CDMA), wideband code division multiple access (WCDMA), global system for mobile communications (GSM), long term evolution (LTE), evolved packet core (EPC), etc., next-generation networks which will be implemented in the future, and cloud computing networks.

The home shopping providing apparatus 130 transmits the home shopping broadcast through image media such as a TV, IPTV, Internet site, etc. Moreover, when the purchase method selection information selected by the user is received from the terminal 110 and the user terminal 114, the home shopping providing apparatus 130 transmits the received information to the mobile payment apparatus 140.

The home shopping providing apparatus 130 according to the present embodiment receives the purchase method selection information about a specific commodity selected by the user from the terminal 110 and the user terminal 114. For example, the home shopping providing apparatus 130 displays at least one of the purchase method information including the "counselor connection", the "ARS", and the "website" through the home shopping broadcast such as a TV, IPTV, Internet site, etc., and the user selects one of the displayed purchase method information and transmits the selected purchase method information to the home shopping providing apparatus 130. Here, the user selects purchase method information about a specific commodity through the "counselor connection", the "ARS", and the "website" and transmits the selected payment method information and OTP information corresponding to the payment method information for the electronic payment. Moreover, the home shopping providing apparatus 130 transmits the received payment method information and the OTP information to the mobile payment apparatus 140 for the electronic payment for a specific commodity.

The home shopping providing apparatus 130 according to the present embodiment comprises the voice call providing unit 132, the automatic response providing unit 134, and the web providing unit 136. Here, the voice call providing unit 132 transmits the OTP information generated through a voice call between the terminal 110 and the counselor terminal (not shown) to the mobile payment apparatus 140. The automatic response providing unit 134 transmits the OTP information, generated using the DTMF input from the terminal 110, to the mobile payment apparatus 140, and the web providing unit 136 transmits the OTP information received from the user terminal 114 to the mobile payment apparatus 140.

The mobile payment apparatus 140 is a concept that includes at least one of a card company server, a phone bill server, a financial company server, a transportation company server, and a mobile payment server, which perform the mobile payment. Of course, the mobile payment apparatus 140 may be implemented as any one of the card company server, the phone bill server, the financial company server, the transportation company server, and the mobile payment server.

The mobile payment apparatus 140 has the same configuration as a typical web server or network server. However, in a software configuration, the mobile payment apparatus 140 includes a program module implemented using languages such as C, C++, Java, Visual Basic, Visual C, etc. The mobile payment apparatus 140 may be implemented in the form of a web server or network server, and the web server refers to a computer system, which is connected to an unspecified number of clients and/or other servers through an open computer network such as the Internet, receives an operation execution request from a client or another web server, and provides the corresponding operation result, and a computer software (web server program) installed for the same. However, it should be understood that the mobile payment apparatus 140 is a broad concept that encompasses a series of application programs executed on the web server and various databases built therein according to circumstances, in addition to the above-mentioned web server program. The mobile payment apparatus 140 may be implemented on a typical server hardware using various web server programs provided for various operating systems such as DOS, Windows, Linux, UNIX, Macintosh, etc. Representative examples thereof may include Website, Internet Information Server (IIS), etc. used in Window environment and CERN, NCSA, APPACH, etc. used in UNIX environment.

Moreover, the mobile payment apparatus 140 may be connected to an authentication system for member registration and a payment system. Furthermore, the mobile payment apparatus 140 classifies member subscription information and stores and manages the information in a member database, which may be implemented inside or outside the mobile payment apparatus 140. Such a database refers to a typical data structure implemented in a storage space (e.g., a hard disk or memory) of a computer system using a database management system (DBMS), in which retrieval (extraction), deletion, edition, addition, etc. of data can be freely performed. The database may be implemented to achieve the purpose of this embodiment using a relational database management system (RDBMS) such as Oracle, Infomix, Sybase, DB2, etc., an object-oriented database management system (OODBMS) such as Gemston, Orion, O2, etc. or an XML native database such as Excelon, Tamino, Sekaiju, etc., and has appropriate fields or elements to achieve their functions.

The mobile payment apparatus 140 may provide a mobile payment service in conjunction with the mobile payment application 112 installed in the terminal 110. That is, when a payment request signal is received from the mobile payment application 112 installed in the terminal 110, the mobile payment apparatus 140 may perform the mobile payment in conjunction with a financial company apparatus. Meanwhile, a member registration process should be performed before performing the mobile payment is performed by the mobile payment apparatus 140. To this end, when at least one of a message authentication procedure completion signal, a user identification information authentication procedure completion signal, and a terminal PIN procedure completion signal is received from the terminal 110, the mobile payment apparatus 140 identifies the member subscription for the user information of the terminal 110, assigns an application ID for the mobile payment, and registers payment method information, thus completing the member registration for the user information of the terminal 110. Here, the payment method information includes at least one of credit card information, check card information, phone bill information, and financial account information.

Moreover, in order to perform the mobile payment, a major payment method registration process should be performed after the member registration process is completed. To this end, when the authentication for the payment method information received from the terminal 110 is completed, the mobile payment apparatus 140 generates an OTP authentication key using an external device based on the payment method information, transmits the generated OTP authentication key to the terminal 110, and registers the payment method information. At this time, the mobile payment apparatus 140 transmits the OTP authentication key after encryption to the terminal 110, and this member registration process of the mobile payment apparatus 140 will now be described in more detail. The mobile payment apparatus 140 receives payment method information from the terminal 110, generates an OTP authentication key using an external device based on the payment method information, registers the payment method information, transmits the generated OTP authentication key to the terminal 110, and controls the payment method information to be inquired or changed in response to a request of the terminal 110.

That is, when the credit card information is to be registered as the major payment method, the mobile payment apparatus 140 inquires payment company information based on the payment method information, and when the payment method included in the payment method information is credit card information, transmits card company information corresponding to the inquired payment company information to the terminal 110. The mobile payment apparatus 140 authenticates the validity of payment method authentication information received from the terminal 110 using the card company apparatus corresponding to the card company information for the validity authentication of the credit card during the registration of the credit card information. Here, the payment method authentication information includes at least one of phone number information, card company identification information, card nickname information, card number information, card expiration date information, virtual card number information, and CVC information, and the card nickname information refers to the information input by the user's manipulation or command. At this time, the mobile payment apparatus 140 transmits at least one of card nickname information, phone number information, card expiration date information, virtual card number information, CVC information, and identification information of the terminal 110 to the card company apparatus to authenticate the validity. Moreover, the mobile payment apparatus 140 generates an OTP authentication key for validated information using a card company OTP providing apparatus connected to the card company apparatus for the generation of the OTP authentication key during the registration of the credit card information. Furthermore, when at least one of the OTP authentication key, card nickname information, virtual card number information, and validated information is identified, the mobile payment apparatus 140 registers the payment method information for the registration of the payment method during the registration of the credit card information.

Moreover, when the phone bill information is to be registered as the major payment method, the mobile payment apparatus 140 inquires payment company information based on the payment method information, and when the payment method included in the payment method information is phone bill information, transmits phone bill request information corresponding to the inquired payment company information to the terminal 110. When phone bill registration is received from the terminal 110 for the generation of the OTP authentication key during registration of a phone bill, the mobile payment apparatus 140 generates an OTP authentication key about the phone bill registration information using the telecommunication company apparatus 150 connected to the terminal 110. Here, the phone bill information includes at least one of phone number information and mobile payment application ID information of the mobile payment application installed in the terminal 110. Moreover, for the generation of the OTP authentication during the registration of the phone bill, the mobile payment apparatus 140 transmits an OTP authentication request signal for the phone number information to the telecommunication company apparatus 150 and receives a corresponding OTP authentication key from the telecommunication company apparatus 150. At this time, the telecommunication company apparatus 150 generates an OTP authentication key for the payment method information using the telecommunication company OTP providing apparatus connected thereto.

Meanwhile, during the inquiry or change of the payment method information, when inquiry request information for the payment method information is received from the terminal 110, the mobile payment apparatus 140 transmits transaction history identification information inquired through a payment mobile web server or a PG web server to the terminal 110. Moreover, when change request information for the payment method information is received from the terminal 110, the mobile payment apparatus 140 changes the payment method based on the change request information and transmits change completion information to the terminal 110.

When the member registration and the major payment method registration are completed in the above manner, the mobile payment can be performed, and a mobile payment method using credit card information will be described below.

The mobile payment apparatus 140 according to the present invention receives payment request information from the home shopping providing apparatus 130, receives payment method information and OTP information corresponding to the payment method information from one of the home shopping providing apparatus 130, the terminal 110, and the user terminal 114, authenticates the OTP information using an external device based on the payment method information, and performs payment processing for the payment request information.

The operation of the mobile payment apparatus 140 according to the present embodiment will now be described in more detail. The mobile payment apparatus 140 receives payment request information depending on purchase method selection method for a specific commodity from the home shopping providing apparatus 130, receives payment method information from one of the home shopping providing apparatus 130, the terminal 110, and the user terminal 114, synchronizes the received information, receives OTP information corresponding to the payment method information from one of the home shopping providing apparatus 130, the terminal 110, and the user terminal 114, authenticates the OTP information based on the payment method information using at least one of the card company apparatus 172 and the telecommunication company apparatus 150, transmits a transaction authorization request signal for the payment method information synchronized with at least one of the card company apparatus 172 and the telecommunication company apparatus 150 when the OTP information is authenticated, receives a transaction authorization response signal corresponding to the transaction authorization request signal, and transmits a payment information verification completion signal to the terminal 110 or the home shopping providing apparatus 130. Moreover, the home shopping providing apparatus 130 may receive and synchronize the payment method information and then inquire a corresponding member using pre-stored phone number information and mobile payment application ID information.

Here, when the payment method information is credit card information, the transaction authorization request signal includes at least one of OTP information, corporate registration number information of the home shopping providing apparatus, virtual card number information, card nickname information, and payment information, and the payment information verification completion signal includes link information for a result information page. The card nickname information refers to the information input by the user's manipulation or command. Meanwhile, when the payment method information is phone bill information, the transaction authorization request signal includes at least one of OTP information, virtual card number information, phone number information on the terminal 110, terminal identification information on the terminal 110, and payment information, and the payment information verification completion signal includes link information for a result information page.

Next, a process in which the mobile payment apparatus 140 performs the mobile payment when the payment method information is credit card information will be described. For the authentication of the OTP information, the mobile payment apparatus 140 identifies the payment method information synchronized with the terminal 110, and when it is determined that the payment method information is credit card information, authenticates the OTP information using the card company OTP providing apparatus 174 connected to the card company apparatus 172. Here, the mobile payment apparatus 140 transmits an OTP authentication request signal to the card company OTP providing apparatus 174, receives an OTP authentication response signal corresponding to the OTP authentication request signal, and determines whether the OTP information is authenticated. Moreover, when receiving OTP information corresponding to the credit card information, the mobile payment apparatus 140 identifies telecommunication company member information on the terminal 110 using the telecommunication company apparatus 150.

Furthermore, when the telecommunication company member information is identified as an authorized member, the mobile payment apparatus 140 transmits an authorization request signal for the mobile payment to the value-added communication network 170 and receives an authorization response signal corresponding to the authorization request signal from the value-added communication network 170. Here, the mobile payment apparatus 140 identifies at least one of phone number information, mobile payment application ID information, name information, and service subscription information to identify the telecommunication company member state.

Next, a process in which the mobile payment apparatus 140 performs the mobile payment when the payment method information is phone bill information will be described. The mobile payment apparatus 140 identifies the synchronized payment method information, and when it is determined that the payment method information is phone bill information, authenticates the OTP information using the telecommunication company OTP providing apparatus 152 connected to the telecommunication company apparatus 150. Here, the mobile payment apparatus 140 transmits an OTP authentication request signal to the telecommunication company OTP providing apparatus 152, receives an OTP authentication response signal corresponding to the OTP authentication request signal, and determines whether the OTP information is authenticated. Moreover, when the OTP information for the phone bill information is authenticated, the mobile payment apparatus 140 transmits a transaction authorization request signal for the phone bill information to the home shopping providing apparatus 130. Moreover, the mobile payment apparatus 140 receives a transaction authorization response signal corresponding to the transaction authorization request signal from the phone bill agency apparatus connected to the home shopping providing apparatus. Moreover, the mobile payment apparatus 140 performs black list (B/L) verification for the transaction authorization request signal through the phone bill agency apparatus 160, and when the B/L verification is completed, receives a transaction authorization response signal corresponding to the transaction authorization request signal from the phone bill agency apparatus 160.

The mobile payment apparatus 140 according to the present embodiment transmits a push message for executing the mobile payment application 112 to the terminal 110 that has accessed the home shopping providing apparatus 130. Here, the push message includes at least one message based on short message service (SMS), multimedia message service (MMS), and Internet protocol (IP). For example, the user receives at least one of purchase method information such as "counselor connection", "ARS", and "website" and payment request information from the home shopping providing apparatus 130 and, at this time, the mobile payment apparatus 140 transmits the push message to the terminal 110 that has accessed the home shopping providing apparatus 130.

Meanwhile, the mobile payment apparatus 140 may further comprise a cloud computing storage unit and a cloud computing unit for cloud computing. The cloud computing storage unit receives payment request information for the accessed terminal 110 from the home shopping providing apparatus 130, receives payment method information from the terminal 110, synchronizes the received information, receives OTP information corresponding to the payment method information from the terminal 110, authenticates the OTP information using at least one of the card company apparatus 172 and the telecommunication company apparatus 150 based on the payment method information, transmits a transaction authorization request signal for the synchronized payment method information to at least one of the card company apparatus 172 and the telecommunication company apparatus 150, receives a transaction authorization response signal corresponding to the transaction authorization request signal, and stores a payment information verification completion signal, which will be transmitted to the terminal 110 or the home shopping providing apparatus 130, in a storage medium, and the clouding computing unit allows the terminal 110 to read and write data from and to the storage medium.

The value-added communication network 170 is a server operated by a value-added communication network provider and connected between the mobile payment apparatus 140 and the card company apparatus 172 to mediate request information for the electronic payment and transmit and receive data.

The telecommunication company apparatus 150 refers to an apparatus that performs various functions required for wireless call processing in conjunction with the communication network 120, such as basic and additional service processing for allowing the terminal 110 to receive a voice or data communication service, subscribers' incoming and outgoing call processing, location registration procedure and handoff procedure processing, connection with other networks, etc. When a control signal is received from the mobile payment apparatus 140 to transmit a message authentication message for the member registration, the telecommunication company apparatus 150 transmits a message authentication message in a predetermined message specification to the terminal 110. Here, the telecommunication company apparatus 150 uses a message center to transmit the message authentication message in the predetermined message specification. Meanwhile, the telecommunication company apparatus 150 according to the present embodiment receives a request signal for telecommunication company member information from the mobile payment apparatus 140 and transmits a response signal determining whether the corresponding telecommunication company member information is authenticated to the mobile payment apparatus 140.

The telecommunication company OTP providing apparatus 152 refers to an apparatus that provides an OTP for the telecommunication company in conjunction with the telecommunication company apparatus 150. Here, the one-time password (OTP) refers to a method of generating and inputting a different password each time, instead of a fixed password. That is, the one-time password refers to an authentication solution that can reduce the exposure of passwords and the possibility of illegal use of user accounts since the reuse of passwords is impossible. That is, the one-time password is used as a two-factor authentication method in financial sites due to its excellent security and mobility, and a hardware token or software token (mobile OTP) generator may be separately required to use the one-time password.

The phone bill agency apparatus 160 refers to an apparatus that basically performs the function of paying communication fees in conjunction with the telecommunication company apparatus 150 and performs payment authorization for the cost corresponding to a phone bill payment made by the terminal 110. That is, when the user of the terminal 110 requests a phone bill payment, the phone bill agency apparatus 160 performs the function of paying the cost corresponding to a payment request signal and authenticates the information related to the phone bill payment. Meanwhile, the phone bill agency apparatus 160 according to the present embodiment performs B/L verification by comparing pre-stored terminal IP B/L information, USIM B/L information, terminal identification B/L information, and parameters included in the transaction authorization request signal.

The card company apparatus 172 is a server that can perform the electronic payment by performing the function of paying the cost corresponding to a payment request signal for a pre-registered credit card or check and authenticating the information related to the credit card or check card. Moreover, the card company apparatus 172 according to the present embodiment performs authentication for the payment method authentication information including at least one of the phone number information, card company identification information, card nickname information, card number information, card expiration date information, virtual card number information, and CVC information, which are received from the mobile payment apparatus 140. Furthermore, the card company apparatus 172 generates an OTP authentication key for the payment method information using the card company OTP providing apparatus 174 connected to the card company apparatus 172. Here, the card company OTP providing apparatus 174 refers to an apparatus that provides an OTP for the card company in conjunction with the card company apparatus 172.

Figure 2:
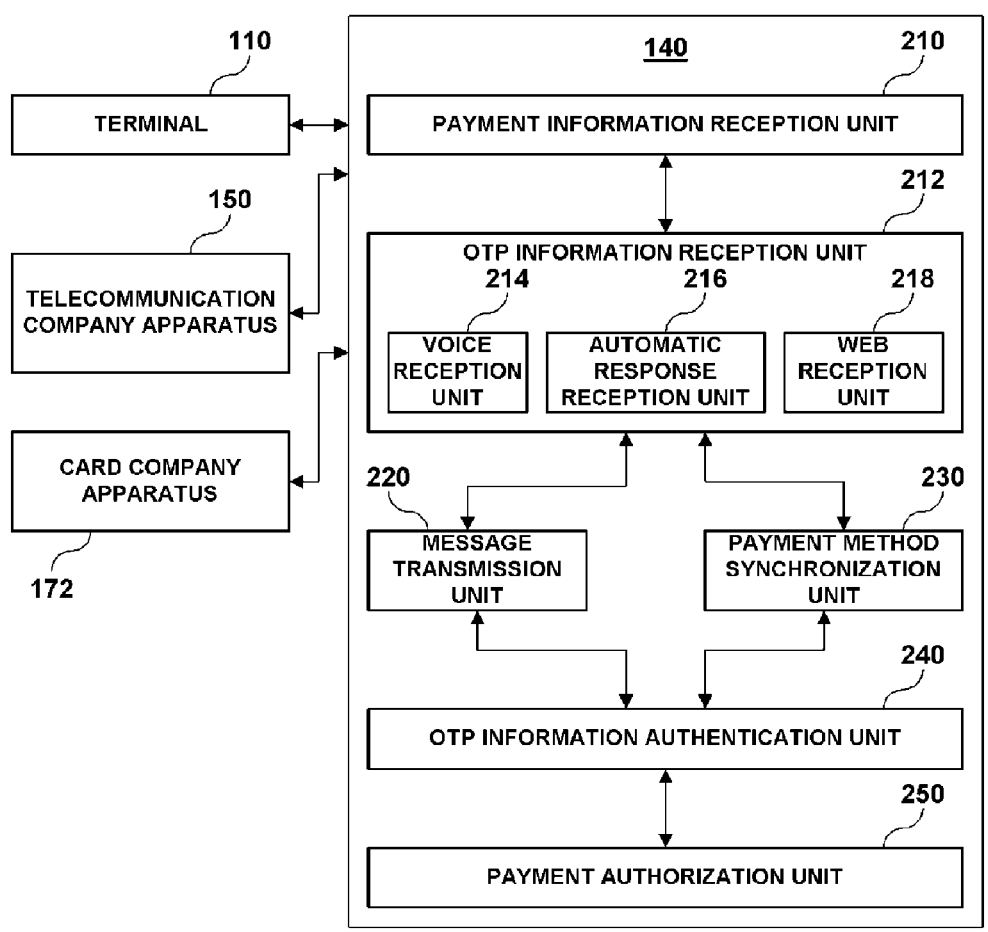
FIG. 2 is a block diagram schematically showing a mobile payment apparatus in accordance with a preferred embodiment of the present invention.

FIG. 2 is a block diagram schematically showing a mobile payment apparatus in accordance with a preferred embodiment of the present invention.

The mobile payment apparatus 140 according to the present embodiment comprises a payment information reception unit 210, an OTP information reception unit 212, a voice reception unit 214, an automatic response reception unit 216, a web reception unit 218, a message transmission unit 220, a payment method synchronization unit 230, an OTP information authentication unit 240, and a payment authorization unit 250. While it is described in this present embodiment that the mobile payment apparatus 140 comprises only the payment information reception unit 210, the OTP information reception unit 212, the voice reception unit 214, the automatic response reception unit 216, the web reception unit 218, the message transmission unit 220, the payment method synchronization unit 230, the OTP information authentication unit 240, and the payment authorization unit 250, this is merely illustrative of the spirit of the embodiment of the present invention, and many alterations and modifications may be made to the components included in the mobile payment apparatus 140 by those having ordinary skill in the art without departing from the spirit of the present invention.

The payment information reception unit 210 receives the payment request information depending on the purchase method selection information for a specific commodity from the home shopping providing apparatus 130. The OTP information reception unit 212 comprises the voice reception unit 214, the automatic response reception unit 216, and the web reception unit 218. The respective modules included in the OTP information reception unit 212 will now be described. The voice reception unit 214 receives the OTP information generated based on information on the voice call between the terminal 110 and the counselor terminal from the voice call providing unit 132 of the home shopping providing apparatus 130. The automatic response reception unit 216 receives the OTP information, generated using the DTMF input from the terminal 110, from the automatic response providing unit 134 of the home shopping providing apparatus 130. The web reception unit 218 receives the OTP information from the user terminal 114 connected to the web providing unit 136.

The message transmission unit 220 transmits a push message for executing the mobile payment application 112 to the terminal 110. Here, the push message includes at least one message based on SMS, MMS, and IP. The payment method synchronization unit 230 receives payment method information from the terminal 110 and synchronizes the received information. Then, the payment method synchronization unit 230 may inquire a corresponding member using pre-stored phone number information and mobile payment application ID information.

The OTP information authentication unit 240 receives OTP information corresponding to the payment method information from the terminal 110 and authenticates the OTP information using at least one of the card company apparatus 172 and the telecommunication company apparatus 150 based on the payment method information. Meanwhile, when it is determined that the payment method information synchronized with the terminal 110 is credit card information, the OTP information authentication unit 240 authenticates the OTP information using the card company OTP providing apparatus 174 connected to the card company apparatus 172. Here, the OTP information authentication unit 240 transmits an OTP authentication request signal to the card company OTP providing apparatus 174, receives an OTP authentication response signal corresponding to the OTP authentication request signal, and determines whether the OTP information is authenticated. Moreover, when receiving OTP information corresponding to the credit card information, the OTP information authentication unit 240 identifies telecommunication company member information on the terminal 110 using the telecommunication company apparatus 150.

Here, the OTP information authentication unit 240 identifies at least one of phone number information, mobile payment application ID information, name information, and service subscription information to identify the telecommunication company member state. Meanwhile, when it is determined that the payment method information synchronized with the terminal 110 is phone bill information, the OTP information authentication unit 240 authenticates the OTP information using the telecommunication company OTP providing apparatus 152 connected to the telecommunication company apparatus 150. Here, the OTP information authentication unit 240 transmits an OTP authentication request signal to the telecommunication company OTP providing apparatus 152, receives an OTP authentication response signal corresponding to the OTP authentication request signal, and determines whether the OTP information is authenticated.

When the OTP information is authenticated by the OTP information authentication unit 240, the payment authorization unit 250 transmits a transaction authorization request signal for the synchronized payment method information to at least one of the card company apparatus 172 and the telecommunication company apparatus 150, receives a transaction authorization response signal corresponding to the transaction authorization request signal, and transmits a payment information verification completion signal to the terminal 110 or the home shopping providing apparatus 130. Meanwhile, in the case where the payment method is the credit card information, when the telecommunication company member information is identified as an authorized member, the payment authorization unit 250 transmits an authorization request signal for the mobile payment to the value-added communication network 170 and receives an authorization response signal corresponding to the authorization request signal from the value-added communication network 170. Meanwhile, in the case where the payment method is the phone bill information, when the OTP information for the phone bill information is authenticated, the payment authorization unit 250 transmits a transaction authorization request signal for the phone bill information to the home shopping providing apparatus 130. Moreover, the payment authorization unit 250 receives a transaction authorization response signal corresponding to the transaction authorization request signal from the phone bill agency apparatus 160 connected to the home shopping providing apparatus 130. Furthermore, the payment authorization unit 250 performs black list (B/L) verification for the transaction authorization request signal through the phone bill agency apparatus 160, and when the B/L verification is completed, receives a transaction authorization response signal corresponding to the transaction authorization request signal from the phone bill agency apparatus 160.

Figure 3:
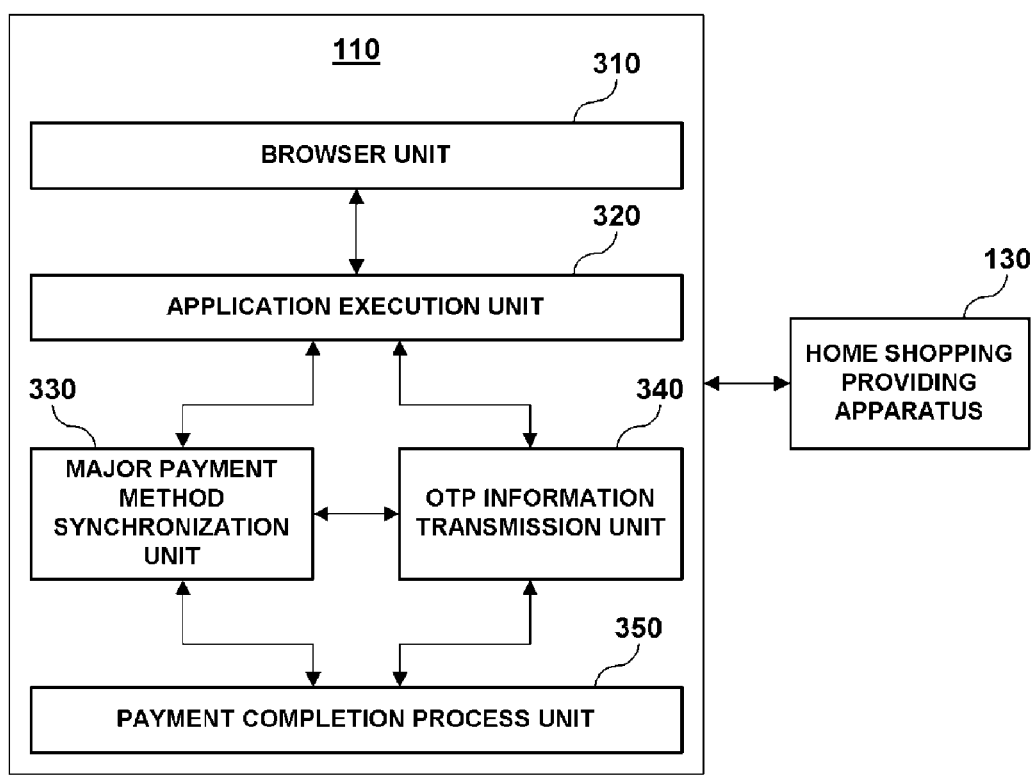
FIG. 3 is a block diagram schematically showing a terminal in accordance with a preferred embodiment of the present invention.

FIG. 3 is a block diagram schematically showing a terminal in accordance with a preferred embodiment of the present invention.

The terminal 110 according to the present embodiment comprises a browser unit 310, an application execution unit 320, a major payment method synchronization unit 330, an OTP information transmission unit 340, and a payment completion process unit 350. While it is described in this present embodiment that the terminal 110 comprises only the browser unit 310, the application execution unit 320, the major payment method synchronization unit 330, the OTP information transmission unit 340, and the payment completion process unit 350, this is merely illustrative of the spirit of the embodiment of the present invention, and many alterations and modifications may be made to the components included in the terminal 110 by those having ordinary skill in the art without departing from the spirit of the present invention. Meanwhile, the application execution unit 320, the major payment method synchronization unit 330, the OTP information transmission unit 340, and the payment completion process unit 350 shown in FIG. 3 may be implemented as the mobile payment application 112.

The browser unit 310 accesses the home shopping providing apparatus 130, displays commodity information received from the home shopping providing apparatus 130, and transmits payment request information for specific commodity information among the commodity information, received from the home shopping providing apparatus 130, to the mobile payment apparatus 140. At this time, the browser unit 310 may be equipped with a browser for the OS of the terminal 110. That is, the browser unit 310 may be equipped with iOS, Android, Window Phone 7, etc., and thus various browsers for the respective OSs may be installed in the browser unit 310.

The application execution unit 320 executes the mobile payment application 112 in response to a call request signal received from the home shopping providing apparatus 130. That is, when receiving the call request signal, the application execution unit 320 may invoke the installed mobile payment application 112. When authentication information input to authenticate payment request information by the user's manipulation or command is authenticated, the major payment method synchronization unit 330 transmits selected payment method information to the mobile payment apparatus 140. The authentication information is PIN information on the mobile payment application 112.

When the payment method information is synchronized with the mobile payment apparatus 140, the OTP information transmission unit 340 generates OTP information based on the payment method information and transmits the generated OTP information to the mobile payment apparatus 140. Here, the process in which the OTP information transmission unit 340 generates the OTP information will now be described. For the mobile payment, the OTP information transmission unit 340 performs member registration and payment method registration using the mobile payment application 112 and, at this time, the OTP information transmission unit 340 receives and an OTP authentication key based on the payment method and stores the encrypted OTP authentication key during the registration of the payment method. Therefore, the OTP information transmission unit 340 may generate pre-stored OTP information based on the selected payment method and display the generated information or may directly transmit the generated OTP information to the mobile payment apparatus 140. For example, when a major payment method is synchronized, the OTP information transmission unit 340 may generate OTP information for the payment method information and display the generated OTP information, and the user may identify the OTP information and directly input the OTP information to the mobile payment apparatus 140 using the terminal 110. That is, when the payment method information is synchronized, the OTP information transmission unit 340 may generate OTP authentication for the payment method information and directly transmit the generated OTP information to the mobile payment apparatus 140. The payment completion process unit 350 receives payment completion information from the mobile payment apparatus 140 and displays the received information.

Figure 4A:
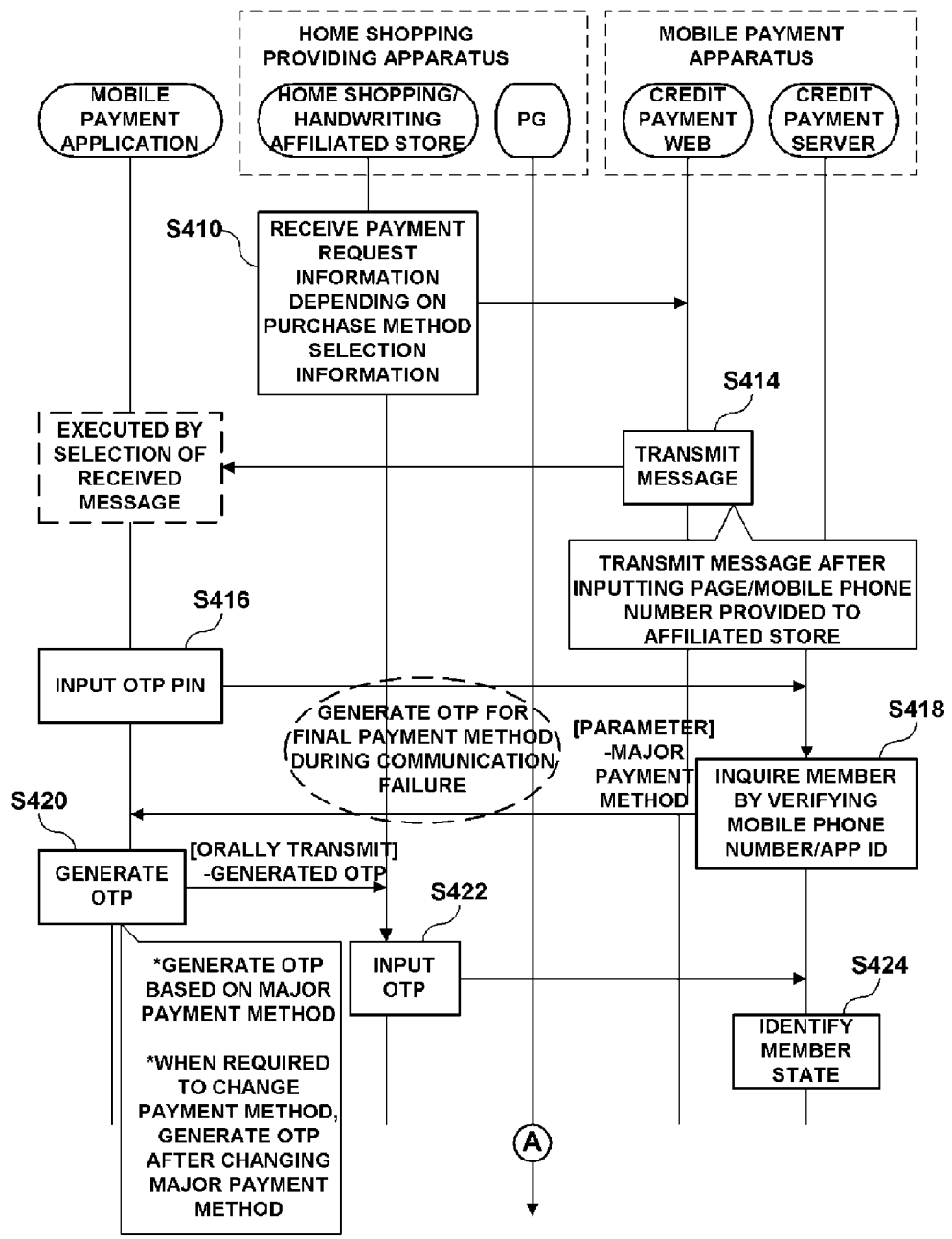
FIG. 4A is a flowchart showing a mobile payment method using home shopping in accordance with a preferred embodiment of the present invention.

FIG. 4A is a flowchart showing a mobile payment method using home shopping in accordance with a preferred embodiment of the present invention.

The home shopping providing apparatus 130 receives payment request information depending on one or more purchase methods, such as "counselor connection", "ARS", and "website", selected by the user from the terminal 110 or the user terminal 114 (S410). That is, the home shopping providing apparatus 130 receives the payment request information through any one of the voice call providing unit 132, the automatic response providing unit 134, and the web providing unit 136.

The mobile payment apparatus 140 receives payment request information depending on purchase method selection information for a specific commodity from the home shopping providing apparatus 130 and transmits a push message for executing the mobile payment application 112 to the terminal 110 having verified identification information (S414). Here, the identification information means at least one of phone number information, mobile directory number (MDN) information, and electronic serial number (ESN) information and may be transmitted from each apparatus depending on the purchase method selection information. Moreover, the mobile payment apparatus 140 transmits a push message including at least one message based on SMS, MMS, and IP to execute the mobile payment application 112 to the terminal 110.

The user selects payment method information by inputting an OTP PIN to the mobile payment application 112 executed in response to the received push message, and the terminal 110 transmits the selected payment method information to the mobile payment apparatus 140 (S416).

The mobile payment apparatus 140 receives and synchronizes the payment method information including credit card information or phone bill information and inquires a corresponding member using pre-stored phone number information and mobile payment application ID information (S418). The user generates OTP information through the terminal 110 and transmits the generated OTP information to the home shopping providing apparatus 130 using the terminal 110 and the user terminal 114 based on the above-mentioned one or more purchase methods such as "counselor connection", "ARS", and "website" (S420). The home shopping providing apparatus 130 transmits the received OTP information to the mobile payment apparatus 140 (S422).

When the OTP information is received from the home shopping providing apparatus 130, the mobile payment apparatus 140 identifies telecommunication company member information on the corresponding terminal using the telecommunication company apparatus 150 (S424). Meanwhile, in step S424, in the process of authenticating the telecommunication company information, the mobile payment apparatus 140 identifies at least one of phone number information, mobile payment application ID information, name information, and service subscription information to identify the telecommunication company member state. At this time, when the synchronized payment method information is credit card information, the mobile payment apparatus 140 authenticates the OTP information using the card company apparatus 172. That is, the telecommunication company apparatus 150 receives a request signal for the telecommunication company member information from the mobile payment apparatus 140 and transmits a response signal determining whether the corresponding telecommunication company member information is authenticated to the mobile payment apparatus 140.

Figure 4B:
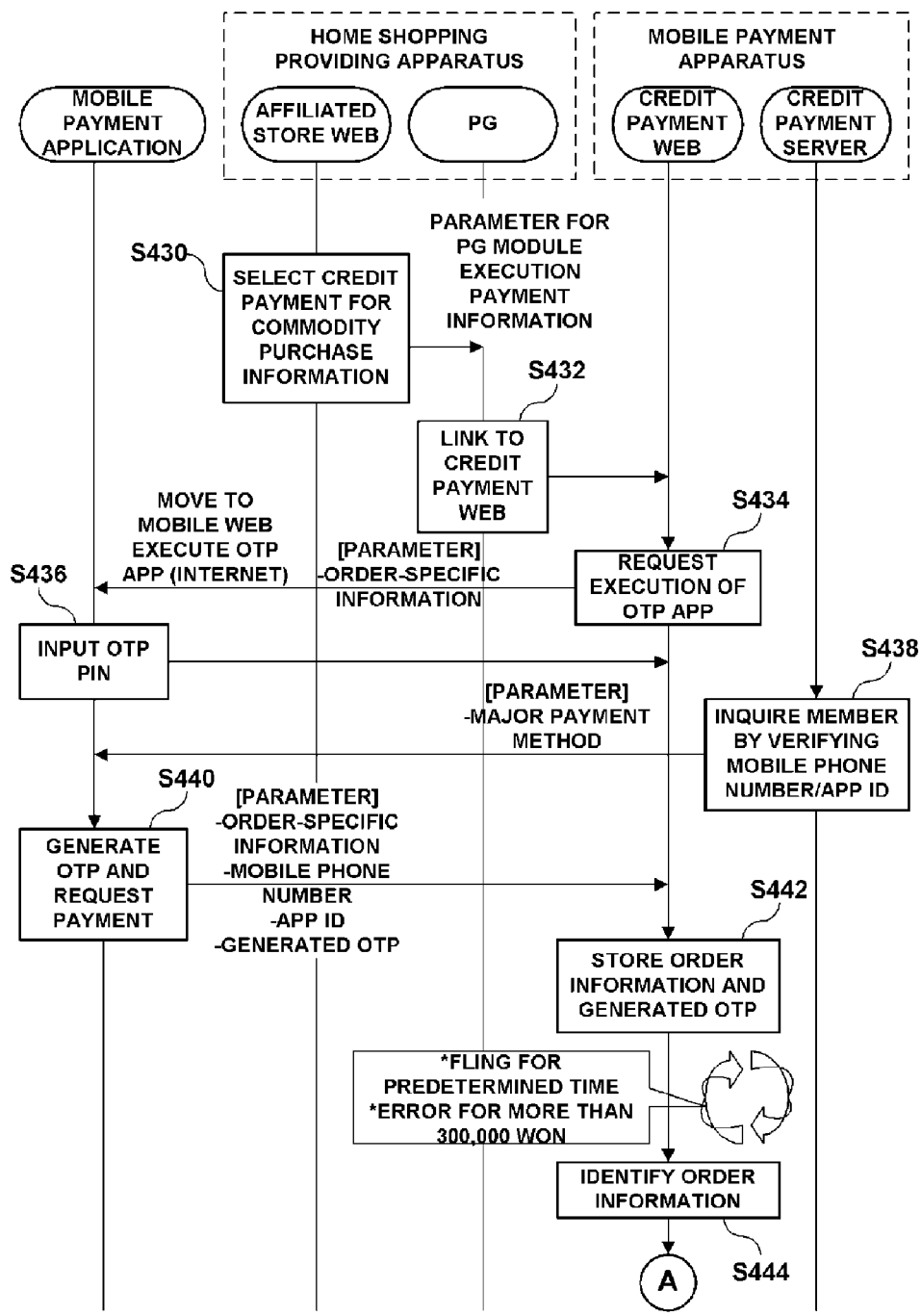
FIG. 4B is a flowchart showing a mobile payment method in accordance with another preferred embodiment of the present invention.

FIG. 4B is a flowchart showing a mobile payment method in accordance with another preferred embodiment of the present invention.

After accessing the home shopping providing apparatus 130 through the terminal 110, the user logs into the home shopping providing apparatus 130 using his or her user account (ID and password) and selects payment request information from commodity information transmitted from the home shopping providing apparatus 130 when he or she wants to purchase a specific commodity (S430). That is, in step S430, the terminal 110 accesses the home shopping providing apparatus 130, displays the commodity information received from the home shopping providing apparatus 130, and transmits the payment request information for specific commodity information among the commodity information, received from the home shopping providing apparatus 130, to the mobile payment apparatus 140 via the home shopping providing apparatus 130.

At this time, the terminal 110 may be equipped with a browser for each OS to access the home shopping providing apparatus 130 using the corresponding browser and perform a user login, thus receiving the commodity information. The home shopping providing apparatus 130 comprises at least one of a web providing device for providing specific commodity information and a PG for linking to the mobile payment apparatus 140 and thus links the terminal 110 to the mobile payment apparatus 140 (S432).

The mobile payment apparatus 140 receives the payment request information for the accessed terminal 110 from the home shopping providing apparatus 130, and the home shopping providing apparatus 130 transmits a call request signal for executing the mobile payment application 112 to the accessed terminal 110 (S434). In step S434, the mobile payment apparatus 140 may request identification information corresponding to user account information or request input of OTP information from the terminal 110. For example, after accessing the home shopping providing apparatus 130 through the terminal 110, the user logs into the home shopping providing apparatus 130 using his or her user account (ID and password) and selects payment request information from the commodity information transmitted from the home shopping providing apparatus 130 when he or she wants to purchase a specific commodity. At this time, the home shopping providing apparatus 130 transmits a call request signal to the accessed terminal 110.

The terminal 110 executes the mobile payment application 112 in response to the call request signal received from the home shopping providing apparatus 130. Moreover, when authentication information input to authenticate the payment request information by the user's manipulation or command is authenticated, the terminal 110 transmits the selected payment method information to the mobile payment apparatus 140 (S436). In step S436, when receiving a call request signal, the terminal 110 may invoke the installed mobile payment application 112. Moreover, when the authentication information input to authenticate the payment request information by the user's manipulation or command is authenticated, the terminal 110 transmits pre-stored payment method information to the mobile payment apparatus 140. Here, the authentication information is PIN information on the mobile payment application 112.

The mobile payment apparatus 140 receives the payment method information from the terminal 110 that has accessed to home shopping providing apparatus 130, synchronizes the received information, and then inquires a corresponding member using pre-stored phone number information and mobile payment application ID information (S438). Then, when the payment method information is synchronized with the mobile payment apparatus 140, the terminal 110 generates OTP information based on the payment method information and transmits the generated OTP information to the mobile payment apparatus 140 (S440). In step S440, for the generation of the OTP authentication, the terminal 110 performs member registration and payment method registration using the mobile payment application 112 and, at this time, the terminal 110 receives an OTP authentication key based on the payment method and stores the received OTP authentication key during the registration of the payment method. Therefore, the terminal 110 may generate pre-stored OTP information based on the selected payment method and display the generated information or may directly transmit the generated OTP information to the mobile payment apparatus 140. For example, when a major payment method is synchronized, the terminal 110 may generate OTP information for the payment method information and display the generated OTP information, and the user may identify the OTP information and directly input the OTP information to the mobile payment apparatus 140 using the terminal 110. Moreover, when the major payment method is synchronized, the terminal 110 may generate OTP information for the payment method information and directly transmit the generated OTP information to the mobile payment apparatus 140.

When the payment method information is synchronized with the terminal 110, the mobile payment apparatus 140 receives OTP information corresponding to the payment method information from the terminal 110, authenticates the OTP information using at least one of the card company apparatus 172 and the telecommunication company apparatus 150 based on the payment method information, generates order information (S442), and identifies the generated order information (S444).

In step S442, for the authentication of the OTP information, the mobile payment apparatus 140 identifies the payment method information synchronized with the terminal 110, and when it is determined that the payment method information is credit card information, authenticates the OTP information using the card company OTP providing apparatus 174 connected to the card company apparatus 172. Here, the mobile payment apparatus 140 transmits an OTP authentication request signal to the card company OTP providing apparatus 174, receives an OTP authentication response signal corresponding to the OTP authentication request signal, and determines whether the OTP information is authenticated. Meanwhile, in step S442, when it is determined that the payment method information synchronized with the terminal 110 is phone bill information, the mobile payment apparatus 140 authenticates the OTP information using the telecommunication company OTP providing apparatus 152 connected to the telecommunication company apparatus 150. Here, the mobile payment apparatus 140 transmits an OTP authentication request signal to the telecommunication company OTP providing apparatus 152, receives an OTP authentication response signal corresponding to the OTP authentication request signal, and determines whether the OTP information is authenticated.

While it is described in FIGS. 4A and 4B that steps S410 to S444 are sequentially performed, this is merely illustrative of the spirit of the embodiment of the present invention, and many alterations and modifications may be made to the steps described in FIGS. 4A and 4B in a manner that the sequence shown in FIGS. 4A and 4B is changed or at least two of steps S410 to S444 are performed in parallel by those having ordinary skill in the art without departing from the spirit of the present invention, and thus FIGS. 4A and 4B are not limited to the time-series sequence.

As mentioned above, the mobile payment method shown in FIGS. 4A and 4B according the present embodiment may be implemented in a program and recorded on a computer-readable medium. The computer-readable medium on which the program for implementing the mobile payment method according to the present embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet). Moreover, the computer-readable recording medium may be distributed in a computer system connected to a network, in which computer readable codes can be stored and executed in a distributed manner. Furthermore, functional programs, codes, and code segments for implementing the present embodiment can be easily construed by programmers skilled in the art to which the present embodiment pertains.

Figure 5:
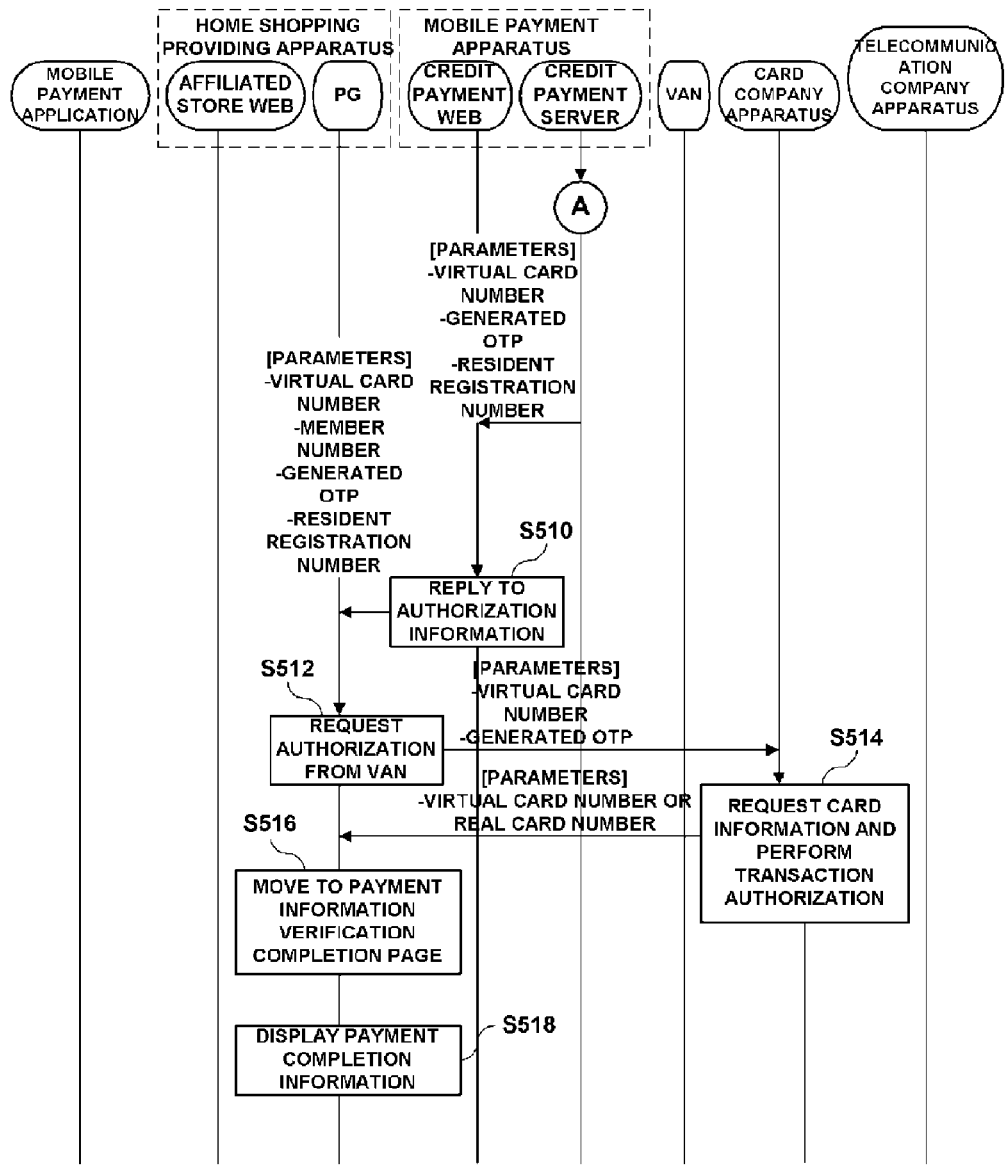
FIG. 5 is a flowchart showing a payment method in which a payment method is a credit card in accordance with a preferred embodiment of the present invention.

FIG. 5 is a flowchart showing a payment method in which a payment method is a credit card in accordance with a preferred embodiment of the present invention.

When the payment method information is credit card, the mobile payment apparatus 140 transmits an authorization request signal for the mobile payment to the value-added communication network 170 (S510). Then, the mobile payment apparatus 140 may receive an authorization response signal corresponding to the authorization request signal from the value-added communication network 170. Moreover, in step S510, the mobile payment apparatus 140 may transmit a signal indicating that the input OTP information is authenticated to the terminal 110 that has accessed the home shopping providing apparatus 130. Here, the authorization request signal includes at least one of card nickname information, member number information, identification information, OTP information, virtual card number information, and resident registration number information. Here, the card nickname information refers to the information input by the user's manipulation or command.

When the mobile payment apparatus 140 transmits the transaction authorization request signal for the major payment method to the home shopping providing apparatus 130, the home shopping providing apparatus 130 transmits a transaction authorization request signal for the major payment method to the card company apparatus 172 (S512). In step S512, the mobile payment apparatus 140 authenticates the OTP information received from the home shopping providing apparatus 130 using the card company apparatus 172. That is, for the authentication of the OTP information, the mobile payment apparatus 140 identifies the payment method information synchronized with the terminal 110, and when it is determined that the payment method information is credit card information, authenticates the OTP information using the card company OTP providing apparatus 174 connected to the card company apparatus 172. Here, the mobile payment apparatus 140 transmits an OTP authentication request signal to the card company OTP providing apparatus 174, receives an OTP authentication response signal corresponding to the OTP authentication request signal, and determines whether the OTP information is authenticated.

The card company apparatus 172 performs transaction authorization in response to the transaction authorization request signal received from the home shopping providing apparatus 130 and transmits a transaction authorization response signal corresponding to the transaction authorization request signal to the home shopping providing apparatus 130 via the value-added communication network 170 and the mobile payment apparatus 140 (S514). Here, the transaction authorization request signal includes at least one of card nickname information, virtual card number information, payment information, and OTP information.

The mobile payment apparatus 140 transmits a payment information verification completion signal to the terminal 110 or the home shopping providing apparatus 130 (S516). In step S536, the mobile payment apparatus 140 receives the transaction authorization response signal corresponding to the transaction authorization request signal from the card company apparatus 172 and then transmits the payment information verification completion signal to the terminal 110 or the home shopping providing apparatus 130. Here, the payment information verification completion signal includes link information for a result information page. The terminal 110 or the user terminal 114 receives payment completion information from the home shopping providing apparatus 130 and displays the received information (S518).

While it is described in FIG. 5 that steps S510 to S518 are sequentially performed, this is merely illustrative of the spirit of the embodiment of the present invention, and many alterations and modifications may be made to the steps described in FIG. 5 in a manner that the sequence shown in FIG. 5 is changed or at least two of steps S510 to S518 are performed in parallel by those having ordinary skill in the art without departing from the spirit of the present invention, and thus FIG. 5 is not limited to the time-series sequence.

FIG. 6 is a flowchart showing a payment method in which a payment method is phone bill information in accordance with a preferred embodiment of the present invention.

When the payment method information is phone bill information, the mobile payment apparatus 140 transmits a transaction authorization request signal for the mobile payment to the home shopping providing apparatus 130 (S610). Here, the transaction authorization request signal includes at least one of OTP information, virtual card number information, phone number information on the terminal 110, terminal identification information on the terminal 110, member number information corresponding to specific user account information, resident registration number information corresponding to specific user account information, and payment information. Then, the mobile payment apparatus 140 may transmit a signal indicating that the input OTP information is authenticated to the terminal 110 that has accessed the home shopping providing apparatus 130.

The mobile payment apparatus 140 transmits a transaction authorization request signal for performing the mobile payment using the phone bill information to the phone bill agency apparatus 160 (S612). In step S612, the mobile payment apparatus 140 authenticates the OTP information received from the home shopping providing apparatus 130 using the telecommunication company apparatus 150. That is, the mobile payment apparatus 140 identifies the synchronized payment method information, and when it is determined that the payment method information is phone bill information, authenticates the OTP information using the telecommunication company OTP providing apparatus 152 connected to the telecommunication company apparatus 150. Here, the mobile payment apparatus 140 transmits an OTP authentication request signal to the telecommunication company OTP providing apparatus 152, receives an OTP authentication response signal corresponding to the OTP authentication request signal, and determines whether the OTP information is authenticated. Moreover, the mobile payment apparatus 140 may transmit phone number information, payment information, and resident registration number information to the phone bill agency apparatus 160. The mobile payment apparatus 140 performs black list (B/L) verification for the transaction authorization request signal through the phone bill agency apparatus 160, and when the B/L verification is completed, receives a transaction authorization response signal corresponding to the transaction authorization request signal from the phone bill agency apparatus 160 (S614). In step 614, the phone bill agency apparatus 160 receives the transaction authorization request signal from the mobile payment apparatus 140, performs the B/L verification by comparing pre-stored terminal IP B/L information, USIM B/L information, terminal identification B/L information, and parameters included in the transaction authorization request signal, and generates the transaction authorization response signal corresponding to the transaction authorization request signal based on the result of the verification, and transmits the generated transaction authorization response signal to the mobile payment apparatus 140.

The home shopping providing apparatus 130 transmits a payment information verification completion signal to the terminal 110 (S616). In step S616, the home shopping providing apparatus 130 receives the transaction authorization response signal corresponding to the transaction authorization request signal from the phone bill agency apparatus 160 and transmits the payment information verification completion signal to the terminal 110. Here, the payment information verification completion signal includes link information for a result information page. The terminal 110 receives payment completion information from the mobile payment apparatus 140 and displays the received information (S618).

While it is described in FIG. 6 that steps S610 to S618 are sequentially performed, this is merely illustrative of the spirit of the embodiment of the present invention, and many alterations and modifications may be made to the steps described in FIG. 6 in a manner that the sequence shown in FIG. 6 is changed or at least two of steps S610 to S618 are performed in parallel by those having ordinary skill in the art without departing from the spirit of the present invention, and thus FIG. 6 is not limited to the time-series sequence.

INDUSTRIAL APPLICABILITY

The present embodiment can be applied to the field of a mobile payment method, system, and apparatus using home shopping, which authenticates OTP information through a phone call to a counselor, an ARS, or a web page depending on a purchase method of a specific commodity selected by a user in a process of performing a mobile payment using home shopping, thus allowing the user to rapidly and safely perform the mobile payment.

Moreover, the present embodiment is a useful invention which transmits OTP information depending on payment method information selected by a user to a corresponding payment apparatus without the need for the user to directly input the OTP information in a process of performing a mobile payment using a terminal, thus allowing the user to more safely perform the payment through authentication of the selected payment method.

The invention claimed is:
1. A mobile payment system comprising:
   a mobile payment apparatus which, when payment request information is received, receives payment method information and one-time password (OTP)

information corresponding to the payment method information from at least one of a terminal, a user terminal, and a home shopping providing apparatus depending on purchase method selection information and, when the OTP information is authenticated using at least one of a telecommunication company apparatus and a card company apparatus, performs payment processing for the payment request information;

the home shopping providing apparatus which transmits the OTP information, generated through a voice call between the terminal and a counselor terminal, and the OTP information, generated using a dual tone multi frequency (DTMF) input from the terminal, to the mobile payment apparatus; and the terminal comprising a microprocessor configured to install a mobile payment application, perform member registration through the mobile payment application, execute the installed mobile payment application, in response to a push message received from the mobile payment apparatus, and transmit, by using the executed mobile payment application, selected payment method information to the mobile payment apparatus when authentication information input to authenticate payment request information by the user's manipulation or command is authenticated, wherein the mobile payment apparatus inquires a corresponding member using pre-stored phone number information and mobile payment application identification (ID) information, wherein, when the member registration is completed, the microprocessor of the terminal is configured to transmit the payment method information to the mobile payment apparatus in order to register the payment method information, receive an encrypted OTP authentication key from the mobile payment apparatus, decrypt the OTP authentication key, re-encrypt the OTP authentication key with information required for authentication of the payment method information, store the re-encrypted OTP authentication key, generate, after the selected payment method information is transmitted to the mobile payment apparatus, the OTP information corresponding to the payment method information based on the stored re-encrypted OTP authentication key, and transmit the generated OTP information corresponding to the payment method information to the mobile payment apparatus, and wherein the mobile payment apparatus is configured to receive payment method information from the terminal, and synchronize the received payment method information depending on the purchase method selection information.

2. The mobile payment system of claim 1, wherein the home shopping providing apparatus comprises:

a voice call providing unit which transmits the OTP information generated through the voice call between the terminal and the counselor terminal to the mobile payment apparatus;

an automatic response providing unit which transmits the OTP information, generated using the DTMF input from the terminal, to the mobile payment apparatus;

a web providing unit which transmits the OTP information received from the user terminal to the mobile payment apparatus; and a payment gateway (PG) which links to the mobile payment apparatus based on the payment request information.

3. A mobile payment apparatus comprising:

a payment information reception unit which receives payment request information depending on purchase method selection information for a specific commodity or payment request information for an accessed terminal from a home shopping providing apparatus;

an OTP information reception unit which receives one-time password (OTP) information from at least one of the home shopping providing apparatus, a terminal, and a user terminal;

a payment method synchronization unit which receives payment method information from the terminal;

an OTP information authentication unit which receives OTP information corresponding to the payment method information from the OTP information reception unit and authenticates the OTP information using at least one of a telecommunication company apparatus and a card company apparatus;

a payment authorization unit which, when the OTP information is authenticated, transmits a transaction authorization request signal for the payment method information to the telecommunication company apparatus or the card company apparatus, receives a transaction authorization response signal corresponding to the transaction authorization request signal, and transmits a payment information verification completion signal to the home shopping providing apparatus; and a message transmission unit which transmits a push message for executing a mobile payment application to a terminal having identification information, wherein the push message includes at least one message based on short message service (SMS), multimedia message service (MMS), and Internet protocol (IP), wherein the mobile payment application is installed in the terminal comprising a microprocessor configured to perform member registration through the mobile payment application, execute the mobile payment application in response to a push message received from the mobile payment apparatus, and transmit, by using the executed mobile payment application, selected payment method information to the mobile payment apparatus when authentication information input to authenticate payment request information by the user's manipulation or command is authenticated, and wherein the mobile payment apparatus inquires a corresponding member using pre-stored phone number information and mobile payment application identification (ID) information, wherein, when the member registration is completed, the microprocessor of the terminal is configured to transmit the payment method information to the mobile payment apparatus in order to register the payment method information, receive an encrypted OTP authentication key from the mobile payment apparatus, decrypt the OTP authentication key, re-encrypt the OTP authentication key with information required for authentication of the payment method information, store the re-encrypted OTP authentication key,
generate, after the selected payment method information is transmitted to the mobile payment apparatus, the OTP information corresponding to the payment method information based on the stored re-encrypted OTP authentication key, and
transmit the generated OTP information corresponding to the payment method information to the mobile payment apparatus,
wherein the payment method synchronization unit is configured to synchronize the received payment method information depending on the purchase method selection information, and
wherein the payment authorization unit is configured to transmit a transaction authorization request signal for the synchronized payment method information to the telecommunication company apparatus or the card company apparatus.

4. The mobile payment apparatus of claim 3, wherein the OTP information reception unit comprises:
a voice reception unit which is connected to a voice call providing unit of the home shopping providing apparatus;
an automatic response reception unit which is connected to an automatic response providing unit of the home shopping providing apparatus; and
a web reception unit which is connected to a web providing unit of the home shopping providing apparatus.

5. The mobile payment apparatus of claim 4, wherein the voice reception unit receives the OTP information, generated based on information on a voice call between the terminal and a counselor terminal, from the voice call providing unit.

6. The mobile payment apparatus of claim 4, wherein the automatic response reception unit receives the OTP information, generated using a dual tone multi frequency (DTMF) input from the terminal, from the automatic response providing unit.

7. The mobile payment apparatus of claim 4, wherein the OTP information reception unit receives identification information on the terminal depending on the purchase method selection information from at least one of the voice call providing unit, the automatic response providing unit, and the web providing unit.

8. The mobile payment apparatus of claim 3, wherein the OTP information authentication unit identifies the payment method information, and when the payment method information is credit card information, authenticates the OTP information using a card company OTP providing apparatus connected to the card company apparatus by transmitting an OTP authentication request signal to the card company OTP providing apparatus and receiving an OTP authentication response signal corresponding to the OTP authentication request signal.

9. The mobile payment apparatus of claim 8, wherein when the OTP information corresponding to the credit card information is generated, the OTP information authentication unit identifies telecommunication company member information on the terminal using the telecommunication company apparatus.

10. The mobile payment apparatus of claim 9, wherein when the telecommunication company member information is identified as an authorized member, the payment authorization unit transmits an authorization request signal for a mobile payment to a value-added communication network (VAN) and receives an authorization response signal corresponding to the authorization request signal from the value-added communication network.

11. The mobile payment apparatus of claim 9, wherein the OTP information authentication unit identifies at least one of phone number information, mobile payment application ID information, name information, and service subscription information to identify the telecommunication company member state.

12. The mobile payment apparatus of claim 3, wherein the OTP information authentication unit identifies the payment method information, and when the payment method information is phone bill information, authenticates the OTP information using a telecommunication company OTP providing apparatus connected to the telecommunication company apparatus by transmitting an OTP authentication request signal to the telecommunication company OTP providing apparatus and receiving an OTP authentication response signal corresponding to the OTP authentication request signal.

13. The mobile payment apparatus of claim 12, wherein when the OTP information for the phone bill information is authenticated, the payment authorization unit transmits the transaction authorization request signal for the phone bill information to the home shopping providing apparatus.

14. The mobile payment apparatus of claim 13, wherein the payment authorization unit receives the transaction authorization response signal corresponding to the transaction authorization request signal from a phone bill agency apparatus connected to the home shopping providing apparatus.

15. The mobile payment apparatus of claim 14, wherein the payment authorization unit performs black list (B/L) verification for the transaction authorization request signal through the phone bill agency apparatus, and when the B/L verification is completed, receives the transaction authorization response signal corresponding to the transaction authorization request signal from the phone bill agency apparatus.

16. The mobile payment apparatus of claim 3, wherein when the payment method information is credit card information, the payment authorization unit transmits the transaction authorization request signal including at least one of card nickname information, virtual card number information, and the OTP information to the card company apparatus and receives the transaction authorization response signal corresponding to the transaction authorization request signal from the card company apparatus.

17. A terminal comprising:
a microprocessor comprising:
a browser unit which accesses a home shopping providing apparatus, displays commodity information received from the home shopping providing apparatus, and transmits payment request information for specific commodity information among the commodity information, received from the home shopping providing apparatus, to a mobile payment apparatus;
an application execution unit which executes a mobile payment application in response to a call request signal received from the home shopping providing apparatus;
a major payment method synchronization unit which, when personal identification number (PIN) information input to authenticate payment request information by a user's manipulation or command is authenticated, transmits selected payment method information to the mobile payment apparatus;

an OTP information transmission unit which, when the payment method information is synchronized with the mobile payment apparatus, generates OTP information based on the payment method information and transmits the generated OTP information to the mobile payment apparatus; and a payment completion process unit which receives payment completion information from the mobile payment apparatus and displays the received information, wherein the mobile payment application is installed in the terminal comprising the microprocessor configured to perform member registration, execute the mobile payment application in response to a push message received from the mobile payment apparatus, and transmit, by using the executed mobile payment application, selected payment method information to the mobile payment apparatus when authentication information input to authenticate payment request information by the user's manipulation or command is authenticated, and wherein the mobile payment apparatus inquires a corresponding member using pre-stored phone number information and mobile payment application identification (ID) information, wherein, when the member registration is completed, the microprocessor of the terminal is configured to transmit the payment method information to the mobile payment apparatus in order to register the payment method information, receive an encrypted OTP authentication key from the mobile payment apparatus, decrypt the OTP authentication key, re-encrypt the OTP authentication key with information required for authentication of the payment method information, store the re-encrypted OTP authentication key, generate, after the selected payment method information is transmitted to the mobile payment apparatus, the OTP information corresponding to the payment method information based on the stored re-encrypted OTP authentication key via the OTP information transmission unit, and transmit the generated OTP information corresponding to the payment method information via the OTP information transmission unit to the mobile payment apparatus, and wherein the mobile payment apparatus receives the payment method information from the terminal, and synchronizes the received payment method information depending on the specific commodity information.

18. A mobile payment method, which performs a mobile payment using home shopping in a mobile payment apparatus, the mobile payment method comprising the steps of:

receiving payment request information depending on purchase method selection information for a specific commodity or payment request information for an accessed terminal from a home shopping providing apparatus;

receiving one-time password (OTP) information from at least one of the home shopping providing apparatus, a terminal, and a user terminal;

receiving payment method information from the terminal and synchronizing the received information depending on the purchase method selection information;

receiving OTP information corresponding to the payment method information and authenticating the OTP information using at least one of a telecommunication company apparatus and a card company apparatus; and when the OTP information is authenticated, transmitting a transaction authorization request signal for the synchronized payment method information to the telecommunication company apparatus or the card company apparatus, receiving a transaction authorization response signal corresponding to the transaction authorization request signal, and transmitting a payment information verification completion signal to the home shopping providing apparatus, wherein the terminal includes a microprocessor that performs:

installing a mobile payment application;

performing member registration through the mobile payment application;

executing the installed mobile payment application in response to a push message received from the mobile payment apparatus; and transmitting, by the executed mobile payment application, selected payment method information to the mobile payment apparatus when authentication information input to authenticate payment request information by the user's manipulation or command is authenticated, and wherein the mobile payment apparatus inquires a corresponding member using pre-stored phone number information and mobile payment application identification (ID) information, wherein, when the member registration is completed, the microprocessor of the terminal performs transmitting the payment method information to the mobile payment apparatus in order to register the payment method information, receiving an encrypted OTP authentication key from the mobile payment apparatus, decrypting the OTP authentication key, re-encrypting the OTP authentication key with information required for authentication of the payment method information, storing the re-encrypted OTP authentication key, generating, after the selected payment method information is transmitted to the mobile payment apparatus, the OTP information corresponding to the payment method information based on the stored re-encrypted OTP authentication key, and transmitting the generated OTP information corresponding to the payment method information to the mobile payment apparatus, and wherein the mobile payment apparatus performs receiving payment method information from the terminal, and synchronizing the received payment method information depending on the purchase method selection information.

19. A mobile payment method, which performs a mobile payment using home shopping in a terminal including a microprocessor, the mobile payment method comprising the steps of:

performing, by using the microprocessor of the terminal, member registration;

transmit the payment method information to a mobile payment apparatus in order to register the payment method information;

receiving, by using the microprocessor of the terminal, an encrypted OTP authentication key from the mobile payment apparatus;

decrypting, by using the microprocessor of the terminal, the OTP authentication key, re-encrypting, by using the microprocessor of the terminal, the OTP authentication key with a one-time password (OTP) personal identification number (PIN) information;

storing, by using the microprocessor of the terminal, the re-encrypted OTP authentication key;

accessing, by using the microprocessor of the terminal, a home shopping providing apparatus, displaying commodity information received from the home shopping providing apparatus, and transmitting payment request information for specific commodity information among the commodity information, received from the home shopping providing apparatus, to a mobile payment apparatus;

executing, by using the microprocessor of the terminal, a mobile payment application in response to a call request signal received from the home shopping providing apparatus;

receiving, by using the microprocessor of the terminal, one-time password (OTP) personal identification number (PIN) information for the mobile payment application by a user's manipulation or command, selecting payment method information, and transmitting selected payment method information to the mobile payment apparatus;

when the payment method information is synchronized with the mobile payment apparatus, generating OTP information based on the re-encrypted OTP authentication key corresponding to the payment method information, and transmitting the generated OTP information to the mobile payment apparatus; and receiving, by using the microprocessor of the terminal, payment completion information from the mobile payment apparatus and displaying the received information, wherein the mobile payment apparatus inquires a corresponding member using pre-stored phone number information and mobile payment application identification (ID) information, and wherein the mobile payment apparatus performs receiving payment method information from the terminal, and synchronizing the received payment method information depending on the purchase method selection information.

\* \* \* \* \*